(12) United States Patent
Kasmir

(10) Patent No.: US 11,381,154 B2
(45) Date of Patent: Jul. 5, 2022

(54) DEHUMMING A CHIME WITH A VIDEO DOORBELL

(71) Applicant: Alarm.com Incorporated, Tysons, VA (US)

(72) Inventor: Seton Paul Kasmir, San Diego, CA (US)

(73) Assignee: Alarm.com Incorporated, Tysons, VA (US)

( * ) Notice: Subject to any disclaimer, the term of this patent is extended or adjusted under 35 U.S.C. 154(b) by 22 days.

(21) Appl. No.: 17/117,030

(22) Filed: Dec. 9, 2020

(65) Prior Publication Data

US 2021/0175792 A1 Jun. 10, 2021

Related U.S. Application Data

(60) Provisional application No. 62/945,790, filed on Dec. 9, 2019.

(51) Int. Cl.
| | |
|---|---|
| *G08B 27/00* | (2006.01) |
| *H02M 1/14* | (2006.01) |
| *H02M 7/219* | (2006.01) |
| *H04N 7/18* | (2006.01) |
| *G08B 3/10* | (2006.01) |

(52) U.S. Cl.
CPC ............ *H02M 1/143* (2013.01); *G08B 3/10* (2013.01); *H02M 7/219* (2013.01); *H04N 7/186* (2013.01)

(58) Field of Classification Search
CPC ......... G02B 30/33; G03B 21/60; G03B 35/22
USPC ........................................................ 340/326
See application file for complete search history.

(56) References Cited

U.S. PATENT DOCUMENTS

| | | | |
|---|---|---|---|
| 7,477,134 B2 | 1/2009 | Langer et al. | |
| 9,179,108 B1 * | 11/2015 | Scalisi | ................... G08B 25/14 |
| 10,062,251 B2 | 8/2018 | Kasmir et al. | |
| 10,172,082 B2 | 1/2019 | Finnegan | |
| 10,311,685 B1 | 6/2019 | Long et al. | |
| 10,560,149 B1 | 2/2020 | Skeoch | |
| 10,607,458 B1 | 3/2020 | Sampson et al. | |
| 2008/0297339 A1 | 12/2008 | Mathews et al. | |
| 2017/0221318 A1 * | 8/2017 | Chen | ......................... H02J 3/12 |

\* cited by examiner

*Primary Examiner* — Tai T Nguyen
(74) *Attorney, Agent, or Firm* — Fish & Richardson P.C.

(57) ABSTRACT

A circuit is described for powering a chime that outputs audio in response to detection of an entity by a video doorbell. The circuit includes a rectifier circuit configured to generate a first signal based on a power source and a first switch coupled to the rectifier circuit. The first switch is configured to provide, based on the first signal, a first DC voltage signal during a first operating mode where the doorbell receives input that triggers actuation of the chime in response to detection of the entity. The circuit includes a second switch coupled to the rectifier circuit and the first switch. Based on the first signal, the second switch provides a second DC voltage signal during a second operating mode where the chime outputs the audio based on the input that triggers actuation of the chime in response to detection of the entity.

20 Claims, 15 Drawing Sheets

DEHUMMING A CHIME WITH A VIDEO DOORBELL

CROSS REFERENCE TO RELATED APPLICATION

This application claims the benefit of U.S. Provisional Application No. 62/945,790, filed on Dec. 9, 2019, which is incorporated herein by reference in its entirety.

FIELD

This specification relates to circuitry for chimes and doorbell systems installed at a property or residence.

BACKGROUND

Doorbells and related monitoring devices are often used at various types of properties, such as a home or commercial business. These doorbells and related devices can be implemented in different ways when installed at a particular location of the property. Some doorbells include hardware circuitry that provide different types of monitoring and control functionality. The functionality afforded by these doorbells, and their respective hardware circuitry, can include wireless and audio signal transmissions. These signal transmissions can be leveraged to monitor persons or items at a property as well as to obtain visual information about the items and communicate with persons at property.

The video doorbell may be a newer type of Wi-Fi video doorbell that replaces the conventional doorbell buttons typically found on homes or properties. Consumers and service providers typically reuse the existing doorbell components and wiring to save installation time and cost. Installation uses the existing wiring, alternating-current (AC) transformer, and an indoor chime. The existing wiring and transformer may not offer adequate energy profiles to meet unique power requirements of newer video/Wi-Fi doorbells. Also, indoor chimes often generate unwanted noise based on the power signals output by the transformer as well as the power demands of the Wi-Fi video doorbell.

SUMMARY

Video doorbells can be specifically designed to use or reuse an AC step down transformer. These transformers may be properly wired to power the chime and the front door. An existing transformer can dictate the structure used in the internal power supplies of video doorbells. In some instances, this power structure creates large narrow peak currents that cause the existing indoor chime (e.g., mechanical chime) to emit a hum. Because of this hum home owners and installers are required to install, inside the home and on the existing chime, a bypass circuit.

In view of the above, this document describes an improved hardware circuit for powering a chime that outputs audio in response to detection of an entity by a video doorbell. More specifically, this document describes techniques for implementing a system that includes a video doorbell and an indoor chime as well as a hardware circuit with one transistor configured as a single pole double throw (SPDT) switch and at least one other transistor configured as a current-controlled device to power the video doorbell during an operating mode of the system where the video doorbell receives input that triggers actuation of the chime in response to detection of the entity. The disclosed hardware circuitry includes a unique implementation of a voltage divider circuit along with a transistor-configured SPDT to switch between at least two signal paths of the circuit.

For example, the hardware circuit passes the current and voltage intended to be applied to the chime through a rectifier to create DC voltage and current. Also, rather than a normally-closed single pole single throw (SPST) relay, the SPDT switch is used where one throw runs all of the power through a first circuit path during normal operation and upon ringing of the chime, the SPDT turns off the first circuit path and a second, different path of the circuit is turned on (e.g., selected or used) to allow current to flow through the chime. In some implementations, the hardware circuit may be used as an alternative to having an inside detection circuit that opens and closes a bypass circuit. In some other implementations, the hardware circuit may be used in addition to (or concurrent with) an inside detection circuit that opens and closes a bypass circuit.

Based on this implementation, the system is configured to eliminate or substantially reduce mechanical chime hum (e.g., unwanted humming) that can occur when a video doorbell is installed at a property. Elimination or substantial reduction of the chime hum using the disclosed system and hardware circuit can thus eliminate the need to install additional dehumming circuitry at the property, which reduces the cost and installation time required to install video doorbell.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes techniques for implementing an improved hardware circuit of a system that includes a power source, video doorbell, and indoor chime installed at a property. The hardware circuitry can be configured to eliminate unwanted humming that occurs when the power source, e.g., a transformer, supplies power to the video doorbell and indoor chime.

Figure 1:
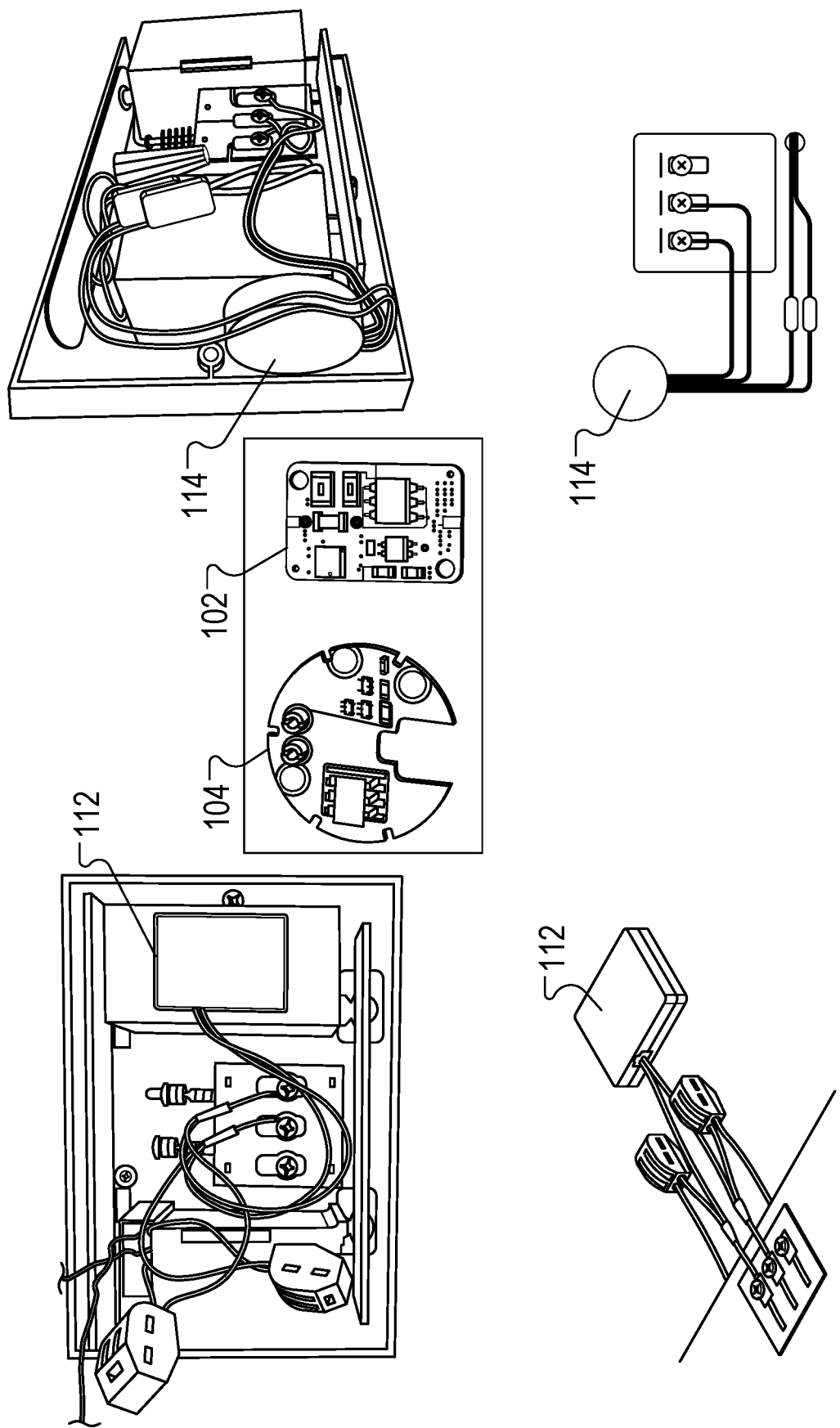
FIG. 1 illustrates example doorbell circuits that are configured to eliminate the hum of a chime due to currents running through the chime to power the doorbell.

FIG. 1 illustrates example doorbell circuits 102, 104 that are each configured to mitigate the hum of a chime due to currents running through the chime to power the doorbell. These doorbell circuits may use a shunting impedance to send some but not all of the current around the chime reducing the current through it and the hum. In some instances, these doorbell circuits 102, 104 are example bypass circuits that are connected to power hungry video doorbells. With the higher power video doorbells, these bypass circuit designs allow current to flow through the mechanical chime but may not reduce the mechanical chime current enough to keep it from humming. The mechanical chime of a doorbell can be rung by an AC waveform when the doorbell circuit shorts the button wires. There may be an issue with magnetizing the chime if DC power is used. FIG. 1 also illustrates an example system that includes device 112, 114 for enclosing an example bypass circuit 102, 104, respectively.

Figure 2:
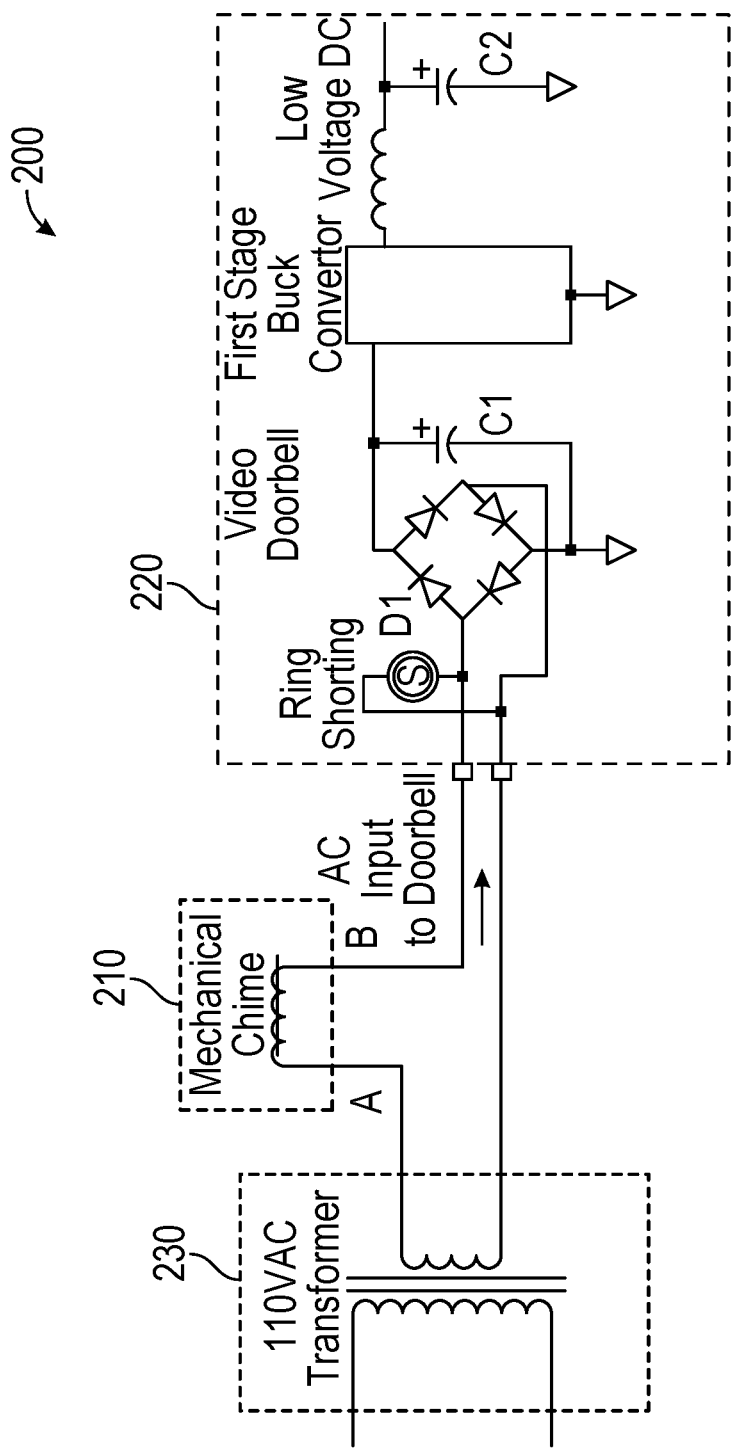
FIGS. 2, 7B, and 7C illustrate example doorbells.

FIG. 2 illustrates an example video doorbell circuit 200. Referring briefly to an example conventional home doorbell wiring diagram, a front, non-video doorbell has a button which is a mechanical switch that may be mounted on the outside of a property, such as a house (or other structure), and is connected to both a transformer by one wire and an indoor chime. The indoor chime can be a mechanical chime (or an electronic chime). The front non-video, doorbell circuit button is open until a person presses it. In other words, the front non-video doorbell button corresponds to a normally open switch of a circuit in the front doorbell, where the switch closes in response to the front doorbell button being pressed or depressed by a user. Pressing the front doorbell button closes the switch and completes a portion of the doorbell circuit so that power supplied by the transformer is applied to the indoor chime. This application of transformer power to the indoor chime causes the familiar doorbell sound such as "ding dong."

Referring now to the video doorbell circuit, circuit 200 includes a mechanical chime 210, a video doorbell 220, and a transformer 230. FIG. 2 illustrates that the wiring to power the video doorbell passes through the mechanical chime 210. In FIG. 2, the mechanical chime 210 is wired in series with the transformer and provides a current path to the doorbell 220. A bypass board 300 (described below) of FIG. 3 can provide a current path to the doorbell 220 both while ringing the chime and while operating normally.

Circuit 200 is an example circuit schematic that includes circuit elements of the video doorbell 220, transformer 230, and mechanical chime 210. Circuit 200 also includes a diode bridge D1 and a capacitor C1 that are inputs to a first stage of a power supply in a typical video doorbell. Examples values for capacitor C1 can be 47 µF to 330 µF, however other values may be used based on design preference. The reason a video doorbell 220 causes a chime 210 to hum, even though the doorbell may use as little as 10% of the available power, will now be described with reference to the circuit of FIG. 2.

The transformer 230 shown in FIG. 2 can convert 110 volts AC to 16 volts RMS. In general, the functionality of transformer 230 differs from that of a regulated power supply. When the transformer 230 is operating at full power the voltage is about 20 volts peak (upper half of the AC waveform) or, in root-mean-square (RMS) terms, 16 volts RMS. Since it is a transformer (e.g., an unregulated power source) and doorbells of the present disclosure draw less than the total power available, the typical voltage is approximately 30 volts peak or approximately 21 volts RMS. The transformer 230 and chime 210 may be external elements of the circuit in FIG. 2, whereas the circuit elements of the video doorbell 220 are inside the video doorbell.

The problem that causes the mechanical chime to hum is that the applied AC input power can only flow current to the onboard power supply when the applied AC voltage is higher than the voltage stored in C1. The capacitor voltage on C1 stays at or near the peak applied AC voltage for a significant portion of the time. This creates a very short time that it is able to charge C1. This charging current needs to supply the amount of power consumed by video doorbell. Since there is little time to generate this charge current, a high peak current is created to equal the average current required. This is based on the standard power expression of Power=Voltage*Current.

The video doorbell 220 mimics the mechanical switch when its button is pressed by shorting the two external wires together, which applies some or all of the power output to the mechanical chime 210, making the ding dong sound. When the doorbell 220 is not ringing, the circuit is not open like the example switch circuit of the mechanical front doorbell described above, but instead, doorbell 220 uses some amount of power that is lower than an amount of power required to ring the indoor chime 210. The two states for voltage across the doorbell 220 is normal operation where greater than 90 percent of the voltage corresponding to the transformer output power is across the doorbell 220. For example, if 20.5 Volts RMS is supplied from the transformer, the voltage across the doorbell 220 will be about 20 Volts RMS.

The other operational state of doorbell 220 is where electronically, the doorbell 220 shorts its two input wires to simulate a button press. When this occurs, there may be little to no voltage across the doorbell 220. Normal operation of the doorbell 220 also includes powering on and booting up, going offline, configuring of the doorbell 220 via an application on an example mobile device such as a smart phone or tablet, and being in an active operational state or being in an inactive, but alive, operational state. The impedance of the chime 210 or the chime bypass may be less than the video doorbell 220 so that under any state other than ringing, most of the voltage from the output of transformer 230 is applied across the doorbell 220.

Unlike mechanical chimes, electronic chimes do not allow for a sufficient amount of current to flow through the chime toward the doorbell 220. This limits or prevents a video doorbell from working in series with the electronic chime and the transformer 230. Instead, the electronic chime appears as a very high resistance such that all the voltage is applied to the electronic chime, which results in no voltage and insufficient current to operate the video doorbell.

For the video doorbell to work, something else must be done to the wired circuit. In some implementations, to complete the circuit when there is an electronic chime, a bypass circuit (described below) may be utilized. The bypass circuit can be used to power down the electronic chime and then wake up the chime with a signal that will ring it only when it needs to be used. There are several examples of bypass circuits for the electronic chime. In general, a bypass circuit bypasses the chime such that most of the power goes directly to the doorbell 220 (e.g., video doorbell) without having to travel through the electronic chime 210.

Figure 3:
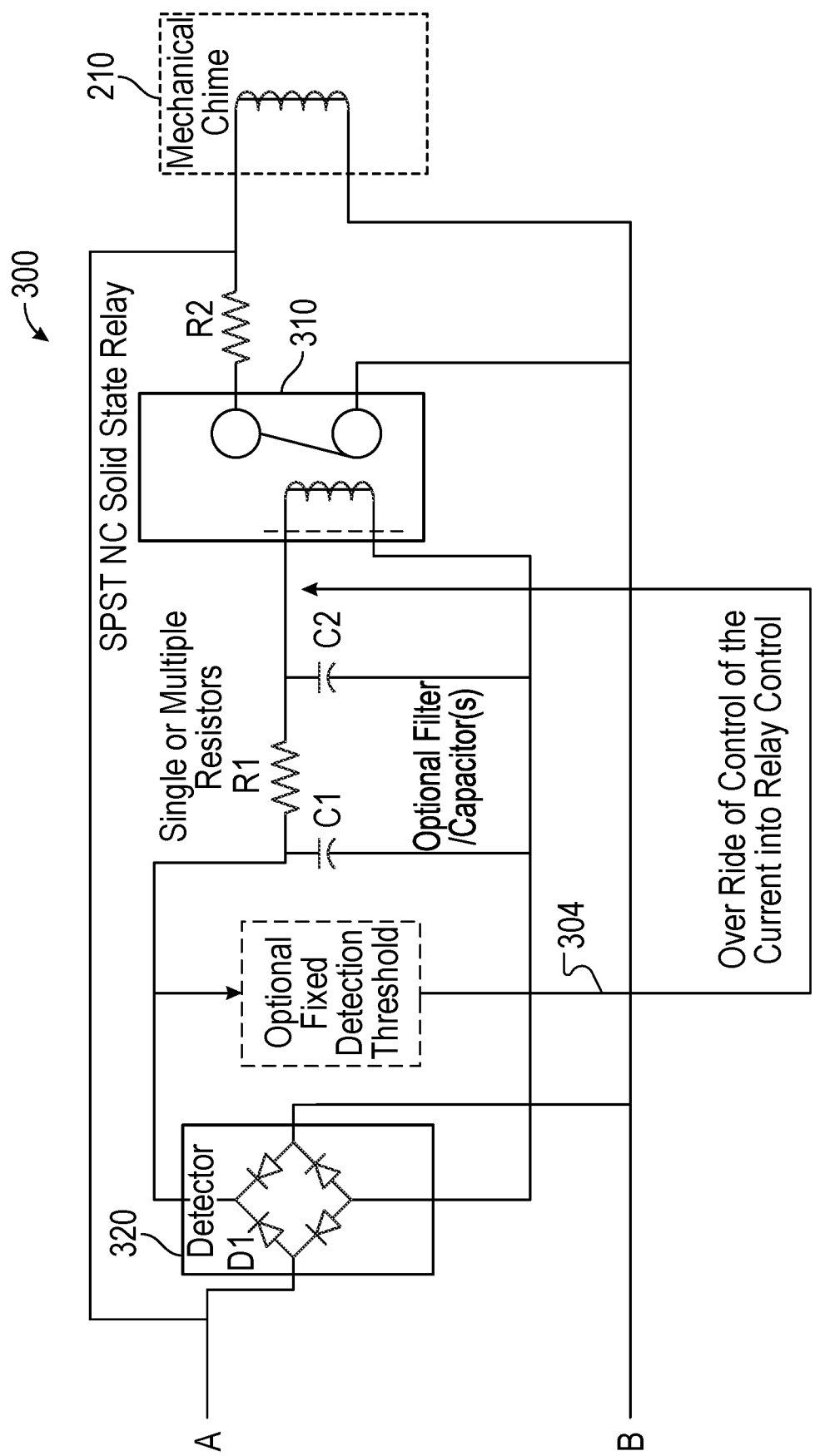
FIG. 3 illustrates an example bypass board that is configured to eliminate the hum of a chime.

FIG. 3 illustrates an example bypass board 300 that is configured to eliminate the hum of the chime 210. The bypass board 300 includes nodes A and B that are configured to connect in parallel to nodes A and B of FIG. 2, respectively. By connecting in parallel, the bypass board 300 presents a parallel non-zero impedance to the chime 210. The shorting structure of the bypass board 300 may be a NC (Normally Closed) SPST solid state relay 310. When the NC SPST solid state relay 310 is closed, current flows in the parallel path to the chime 310.

The bypass board 300 includes a voltage detection circuit 320 that is configured to detect when the bypass board 300 should stop bypassing the chime 210 and allow the power to be applied to the chime 210. When the doorbell wires are shorted together, this causes the AC voltage across the chime 210 to increase, for example, from a peak of 1.5 volts to near the full transformer voltage, such as 16 volts RMS under full ring loading. The voltage detection circuit 320 detector outputs a DC voltage proportional to the peak AC input. A significant rise in the DC voltage from the detection circuit 320 is used to open the relay that removes the bypass and applies all, or nearly all, the power to the chime 210.

The voltage detection circuit 320 may include a diode to create a higher DC voltage related to the higher voltage applied to the chime during a doorbell ring. The doorbell may use the higher voltage to create a current that opens the solid state relay 310 so that most of the power is applied to the chime 210. In some implementations, a bypass circuit may use an additional voltage detection method other than the doorbell shorting its input wires.

In more detail, the wires that connect the bypass board 300 to the chime 210 may connect to a voltage detector that uses a bridge diode that is connected to the control of the solid state relay 310. The voltage out of the detector may be applied to a resistor. After some filtering, the voltage may be used as a control input to the solid state relay 310.

The bypass board 300 may include a resistor in series with the relay when closed. This may cause the chime 210 to not be completely shorted, which allows current to flow through the chime 210, still causing faint hum.

In some instances, the doorbell received up to ninety percent of the voltage from the transformer. This is because the chime 210 is about eight ohms and the doorbell is about 1.6 watts. With a high powered video doorbell 220 of 5 to 10 watts, the impedance of the video doorbell 220 will be lower compared to the chime 210, and the video doorbell 220, this ninety percent may no longer be the case such that a higher voltage appears at the chime bypass so that the overall impedance of the bypass board 300 must be lowered. In some instances, the circuit 200 does not send AC through the chime 210, just DC. In some instances, the circuit 200 does not ruin it with DC by, for example, magnetizing the coil because it is only at a moment in time.

Figure 4A:
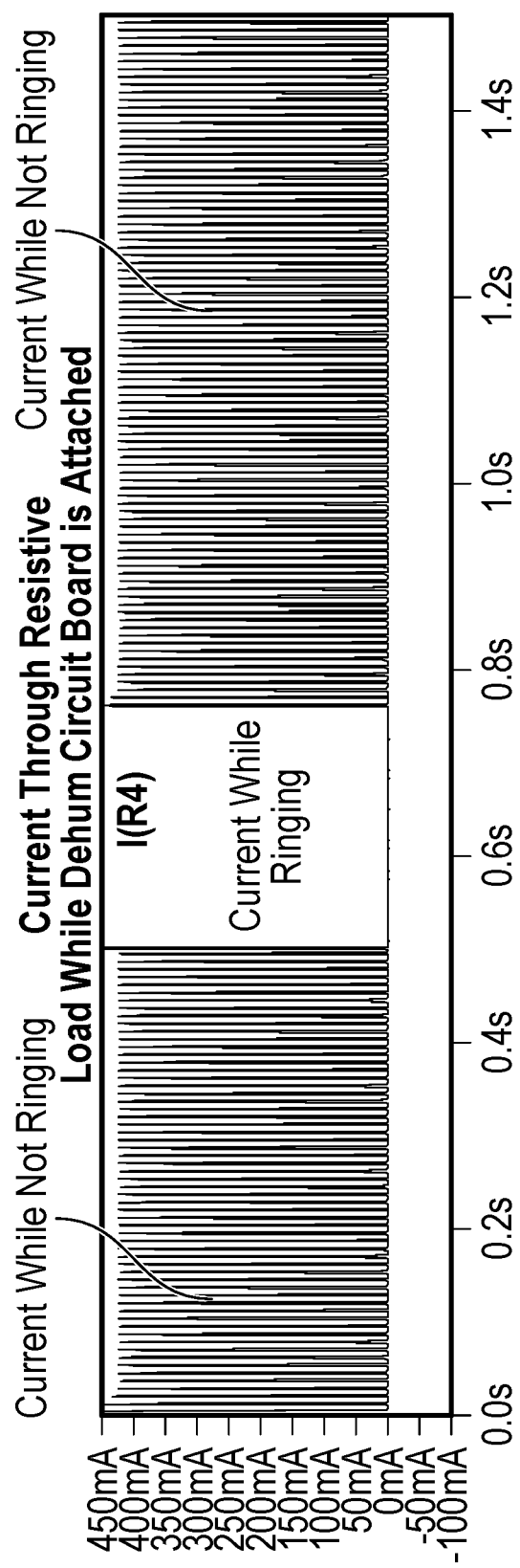
FIGS. 4A-4C, 5, 6, 7A, 8, and 9-11 illustrate example voltage and current measurements of example doorbell circuits.
Figure 4B:
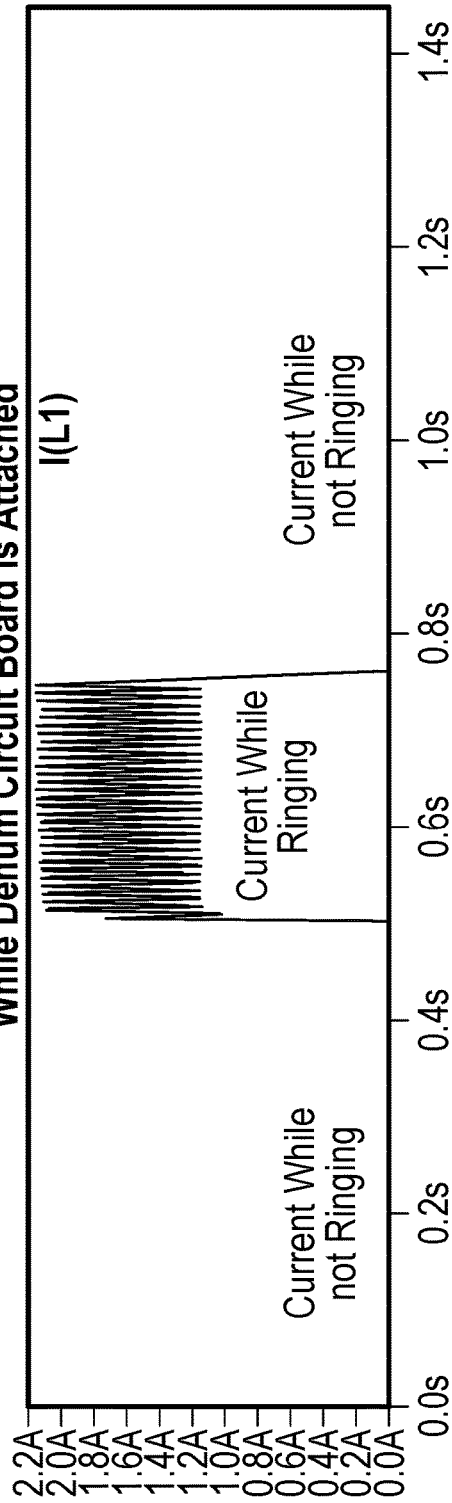
Figure 4C:
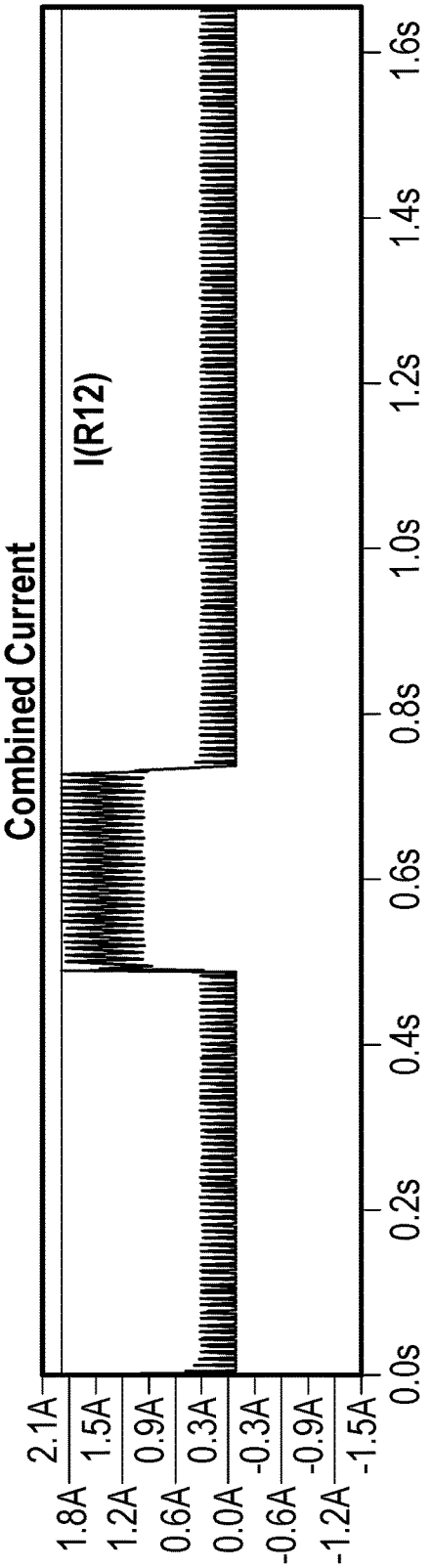
Figure 5:
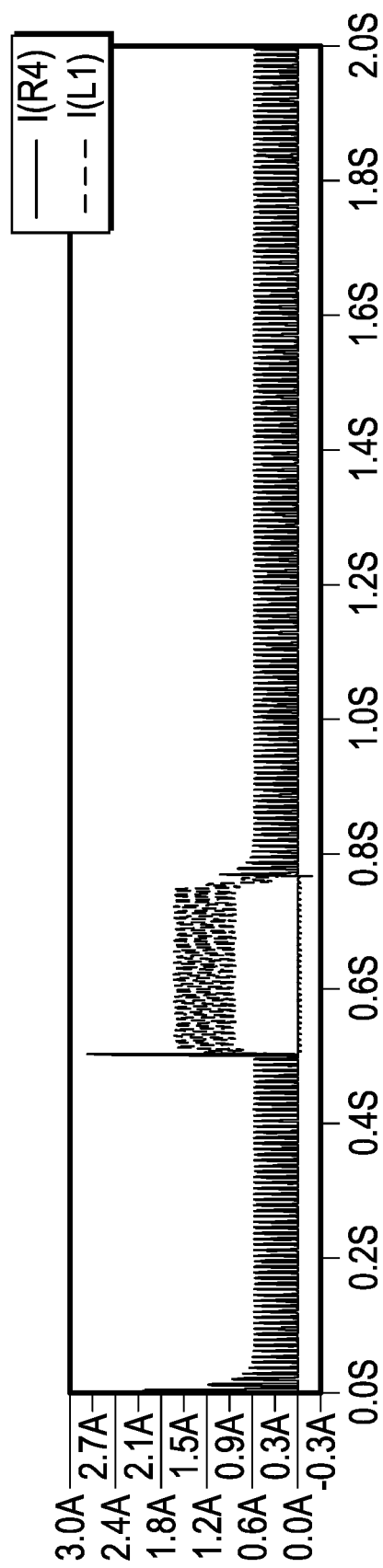

FIG. 4A illustrates an example current measurement of current through a resistive load while the dehumming circuit 720 (described below) is connected. When ringing the chime, this resistance path is turned off and the path of current flowing through the chime is turned on. FIG. 4B illustrates an example current measurement of current through the chime while the dehumming circuit 720 is connected. FIG. 4C illustrates an example current measurement of the combined current from FIGS. 4A and 4B. FIG. 5 may illustrate similar measurements as FIG. 4C.

In some instances, the chime may not receive power for a short period of time, for example hundreds of milliseconds. This small amount of time means that passing DC power through the chime has virtually no effect on the chime.

Figure 6:
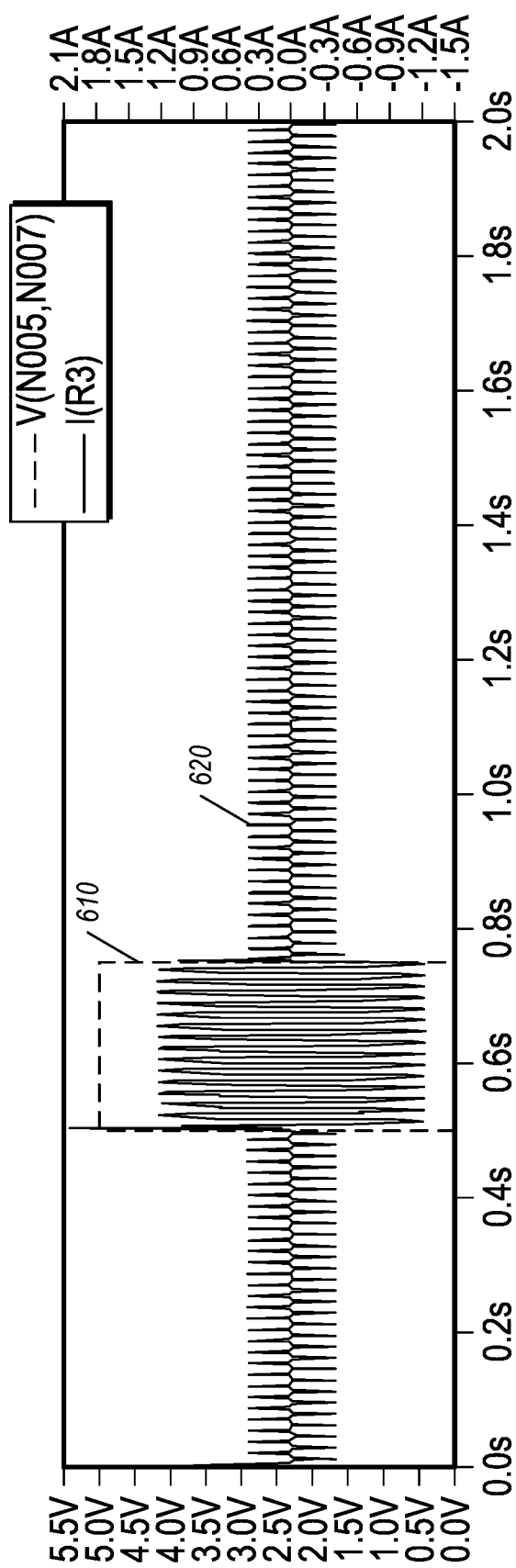

FIG. 6 illustrates example voltage and current measurements of the doorbell circuit in FIG. 2. Trace 610 is a ring control signal where high is a ring. Trace 620 is the current that flows around the doorbell loop circuit that is the same as the current that flows through node A to node B of FIG. 2.

Figure 7A:
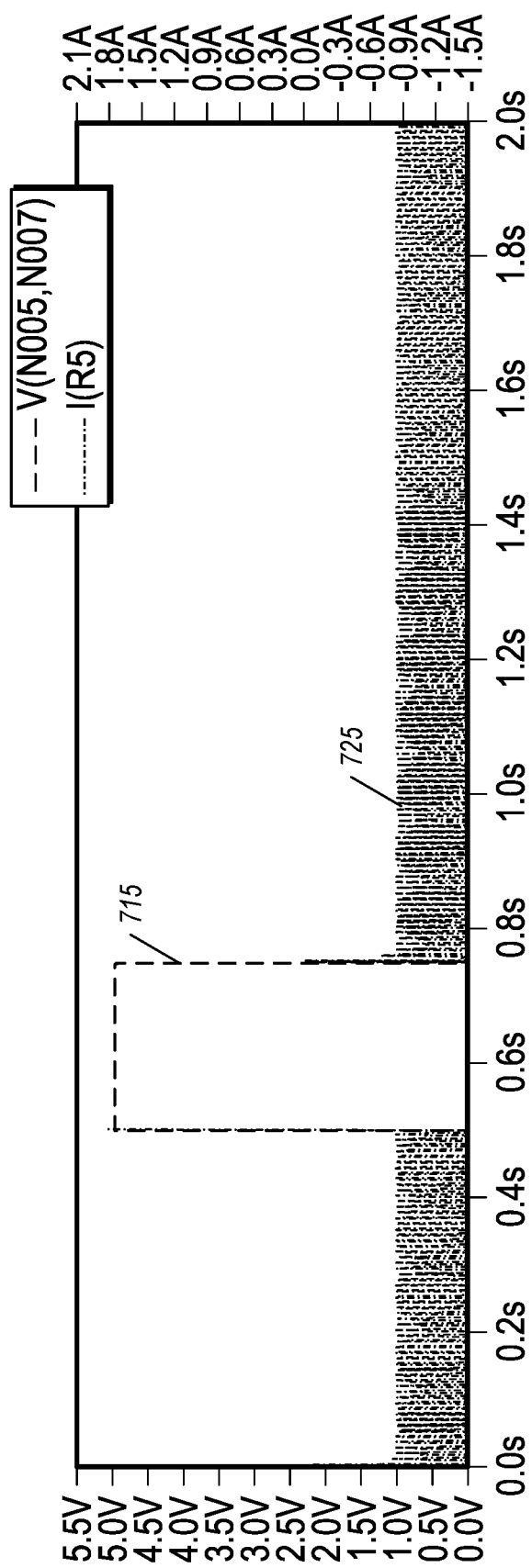
Figure 7B:
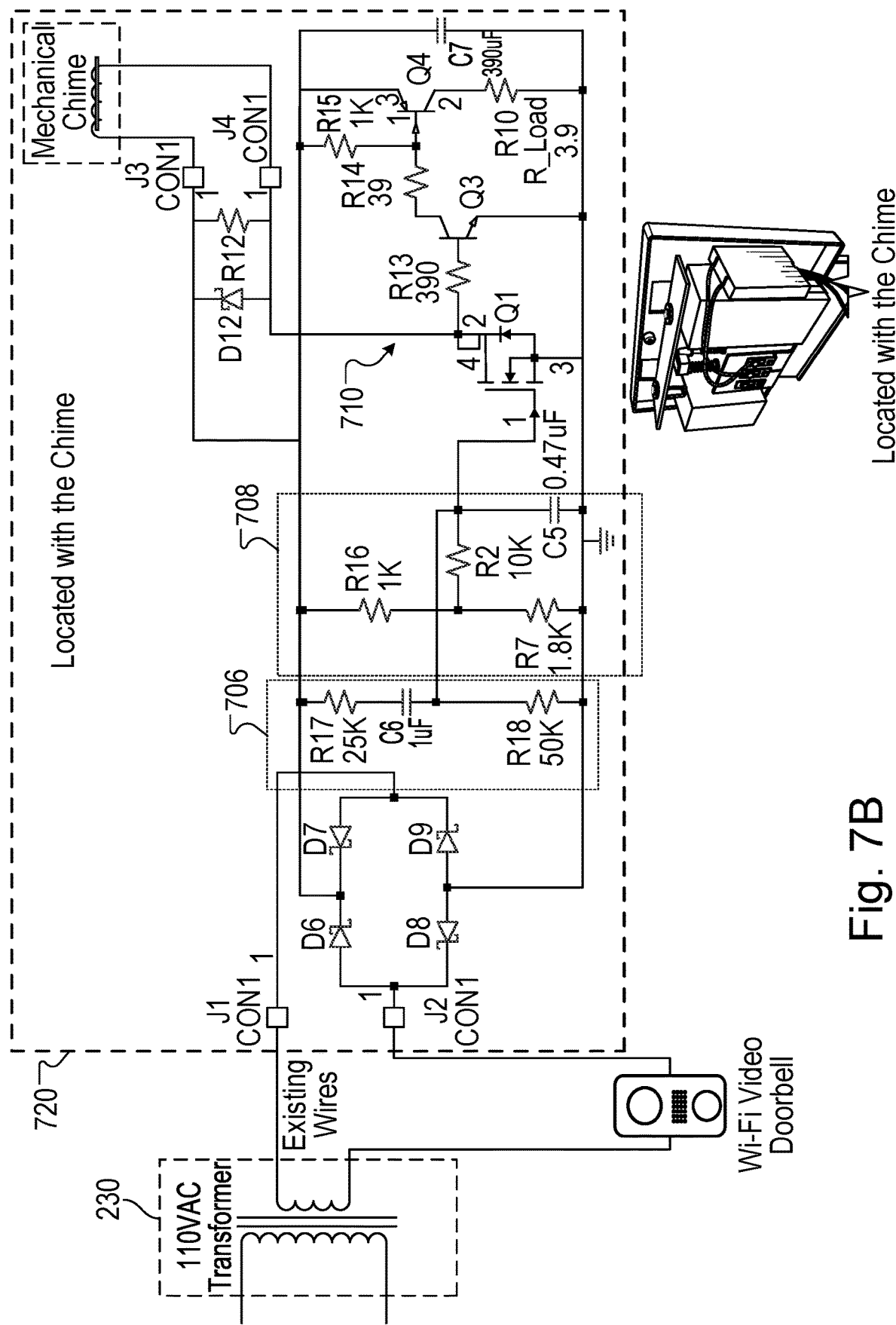
Figure 7C:
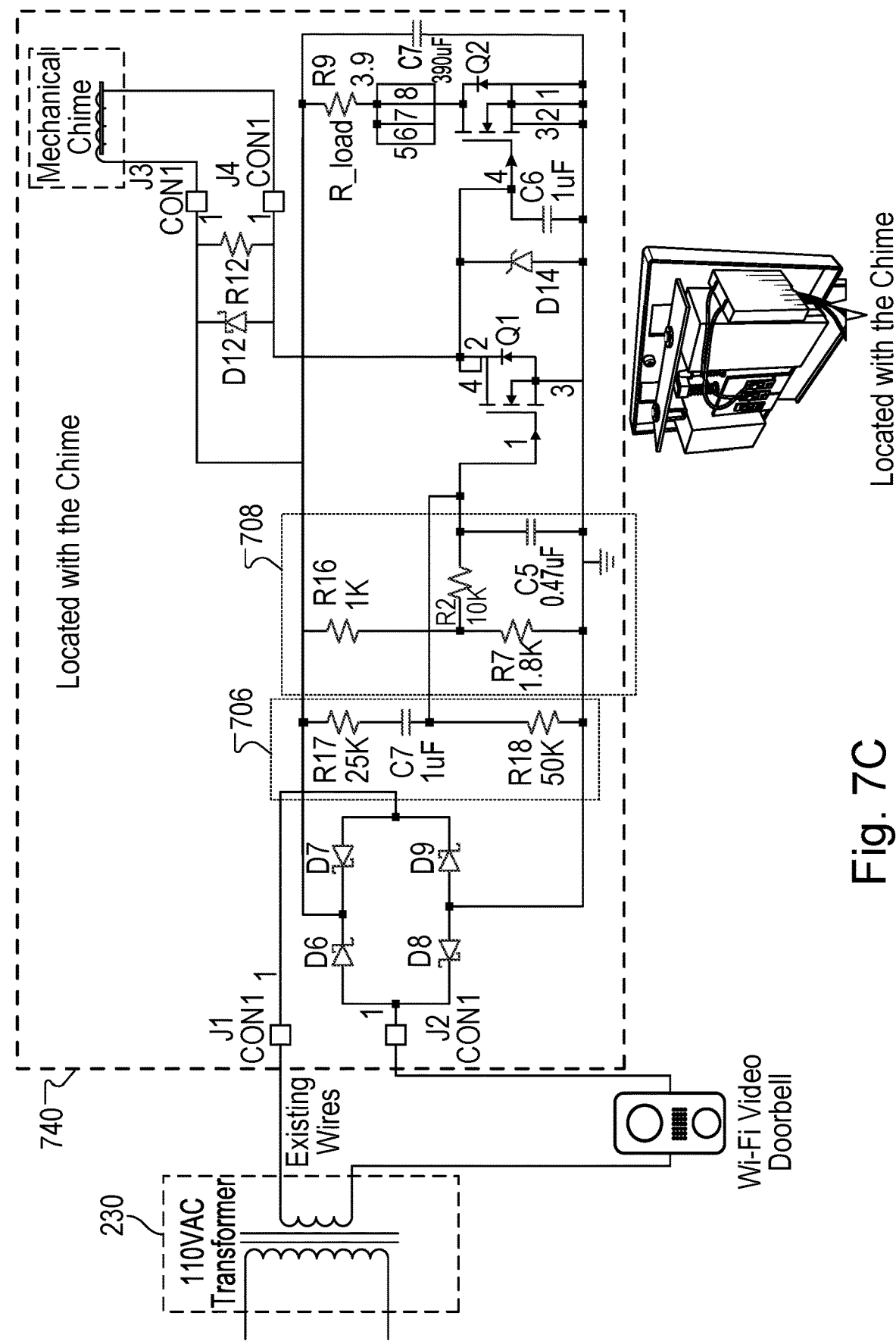

FIG. 7A illustrates example voltage and current measurements of the doorbell circuit in FIG. 7B or 7C. Trace 715 is a ring control signal where high is a ring. Trace 725 is the current that flows through the resistor R_Load in FIG. 3, which is almost zero during a ring. FIG. 7A represents a similar measurement as FIG. 4A.

FIGS. 7B and 7C illustrate an example doorbell circuit 720, 740, respectively. Each of the doorbell circuits 720, 740 includes a video doorbell, a transformer 230, and a respective dehumming circuit 720, 740. In some implementations, the circuits 720, 740, can include a resistor value that represents the resistance of the wiring at a residence, home, or property that includes the doorbell.

Each of the dehumming circuits 720, 740 has two functions. When signaled by the doorbell to ring by the doorbell shorting its wires, the each of the dehumming circuits 720, 740 are configured to apply all, or nearly all, of the available transformer voltage and current to the chime. When not ringing, each of the dehumming circuits 720, 740 completes the circuit with low impedance so that most of the transformer power is applied to the doorbell. Each of the dehumming circuits 720, 740 is configured to pass the current and voltage intended to be applied to the chime through a rectifier to create a DC voltage and current. The dehumming circuit 720 creates a SPDT switch (e.g., Q1) that, when in one position, runs the power through a small resistance during typical operation.

Figure 8:
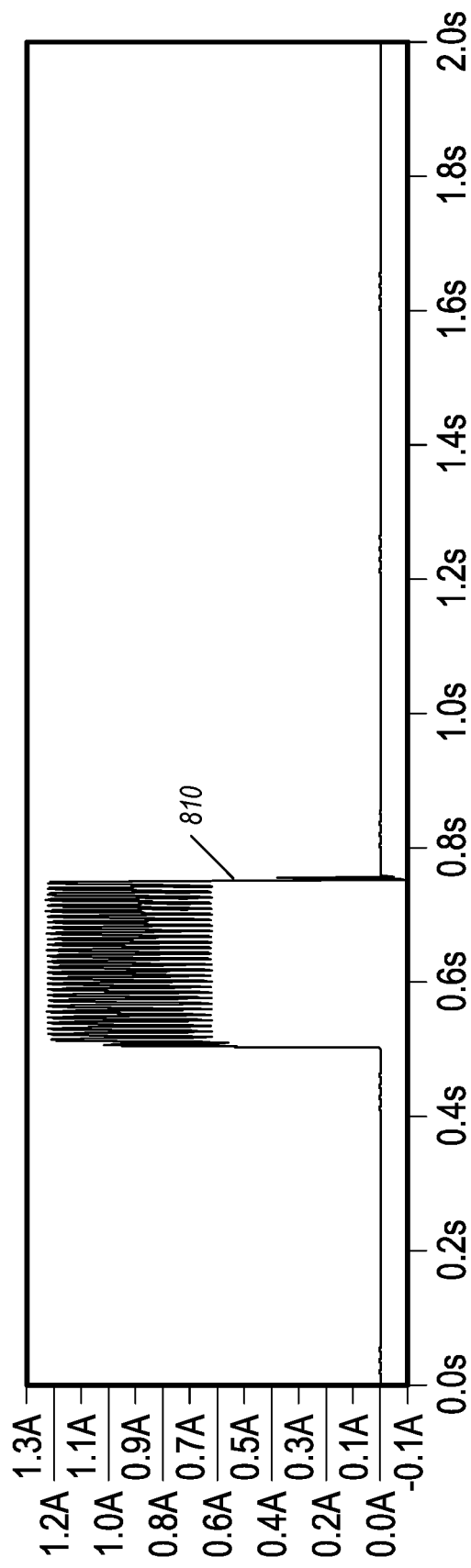

FIG. 8 illustrates example voltage and current measurements of the doorbell circuit in FIG. 7B or 7C. Trace 810 is the current that flows through the chime. Current may only flow through the chime during a ring. Current through the chime is near zero when not ringing. FIG. 8 represents a similar measurement as FIG. 4B.

Referring again to FIG. 7B, the example circuit 720 operates similarly as the example circuit 740 of FIG. 7C. Q1 may operate the same in that it turns on when a ringing voltage is applied and the chime current passes through it. The difference is instead of using a low voltage to turn on the transistor that passes current through R-Load, a set of transistors Q3 and Q4 turn on based upon small current available from a very low voltage associated with transistor, Q1. The two transistors Q3 and Q4, unlike where Q2 did not require any current, the bipolar transistors Q3 and Q4 do require current. Two transistors amplify the current so only a small amount of current is required to activate the first transistor Q1 when it is not ringing.

In some implementations, the circuit illustrated in FIG. 7B includes a differentiator circuit 706 that is coupled to a voltage divider circuit 708. The circuit also includes switch control circuitry 710, which is described in detail below.

The differentiator circuit 706 cooperates with the voltage divider circuit 708 to accelerate turning off the transistor switch Q1 in the absence of an applied voltage to the chime. In some implementations, the differentiator circuit 706 assists or supplements the voltage divider circuit 708 to increase the rate at which Q1 turns off when the doorbell is not ringing in the chime. In some other implementations, the differentiator ensures that Q1 turns OFF in the absence of an applied voltage to the chime. In one instance, the differentiator circuit 706 increases the response time of the dehum circuit 720, 740 by accelerating the time it takes for Q1 turn ON, whereas in another instance the differentiator circuit 706 increases the response time of the dehum circuit 720, 740, by accelerating the time it takes for Q1 turn OFF.

The voltage divider circuit 710 is coupled to the rectifier circuit and the switch Q1. In some cases, the voltage divider circuit 710 is generally intermediate the rectifier circuit and the switch Q1. The rectifier circuit is formed based on the diodes D6, D7, D8, and D9. The voltage divider 710 is configured to generate a voltage that is proportional to the signal generated by the rectifier circuit. The voltage divider circuit 710 can generate this voltage signal by adjusting a magnitude of the voltage signal generated by the rectifier circuit. In some implementations, the voltage divider circuit 710 generates an adjusted voltage signal that is proportional to the signal generated by the rectifier circuit by adjusting a magnitude of the signal output by the rectifier circuit.

The switch control circuitry 710 includes the transistor switches Q3 and Q4. The control function of the switch control circuit 710 can be based on Q3 being coupled to the transistor switch Q1. In this implementation, the transistor switch Q3 is a current amplifier that generates a control signal to cause the transistor Q4 to turn on and provide a DC voltage signal used to power the vide doorbell 220. Transistor Q1 can be configured as a single pole double throw (SPDT) switch that is used to switch between at least two signal paths of the circuit 720.

For example, the circuit 720 (or 740) can includes a first signal path that corresponds to a first operating mode, where the video doorbell does not ring the chime, and transistor switch Q4 routes power signals of the power source using the first signal path to apply available power of the power source to the video doorbell. The circuit 720 (or 740) also includes a second, different signal path that corresponds to a second operating mode, where the video doorbell rings the chime, and the transistor switch Q1 uses the second signal path to route power signals of the power source and apply available power of the power source to the chime.

The power is applied to ring the chime so the chime outputs or generates an audio sound during the second operating mode, such as when a person pushes a doorbell button on the video doorbell. In some implementations, the available power of the power source that is applied is all of the power that is output by the power source.

In some implementations, circuit 720 is configured such that: a) transistor switch Q4 is a current-controlled bipolar junction transistor (BJT) that generates a base-emitter voltage from signals generated by the rectifier circuit and based on a current signal generated by transistor switch Q3; b) transistor switch Q1 is a voltage-controlled field effect transistor (FET) that generates a gate-to-source voltage proportional to a voltage signal generated by the rectifier circuit; and c) transistor switch Q3 is a current-controlled BJT that generates its current signal based on a threshold amount of current that flows along a circuit path that couples transistor switch Q3 to transistor switch Q3.

Based on transistor Q1, the circuit 720 (or 740) can be configured to generate a DC voltage signal for a threshold time period to supply power to the chime without generating a current that induces magnetic effects in the chime, such as magnet effects that can disrupt operation of the chime. The threshold time period can be less than 200 milliseconds or between 200 and 500 milliseconds. Other threshold time periods may also be used. In some implementations, the transistor switch Q1 is a field-effect transistor that includes a gate, a drain, and a source and a voltage at the gate of transistor Q1 is used to control when a current signal is routed through the chime 210 to generate the audio. This current signal corresponds to an output power of the power source or transformer.

The chime 210 can play, generate, or otherwise provide audio based on different operations. For example, the chime 210 outputs audio in response to a button on the video doorbell 220 being pressed by an individual. The video doorbell 220 may include or be configured to access an object detector, such as machine-learning (ML) model or ML based object detector. For example, the object detector can be a trained neural network model (e.g., a convolutional neural network) that detects objects or items in an image in response to processing the images through layers of the neural network.

The chime 210 may output audio in response to detection of an entity based on the object detector of the video doorbell that detects the entity as an object in an image frame captured by the video doorbell. In some implementations, detection of an entity, e.g., by a pressing of the button on the video doorbell 220 or recognition of an object, is represented as a parameter signal input to the video doorbell 220 that triggers actuation of the chime in response to detection of an entity. In some other implementations, the chime 210 outputs audio in response to detection of an individual based on: a proximity sensor of the video doorbell 220 that detects individuals within a threshold proximity of the property where the video doorbell is installed; or a motion sensor of the video doorbell 220 that detects motion within a threshold distance of the video doorbell.

Figure 9:
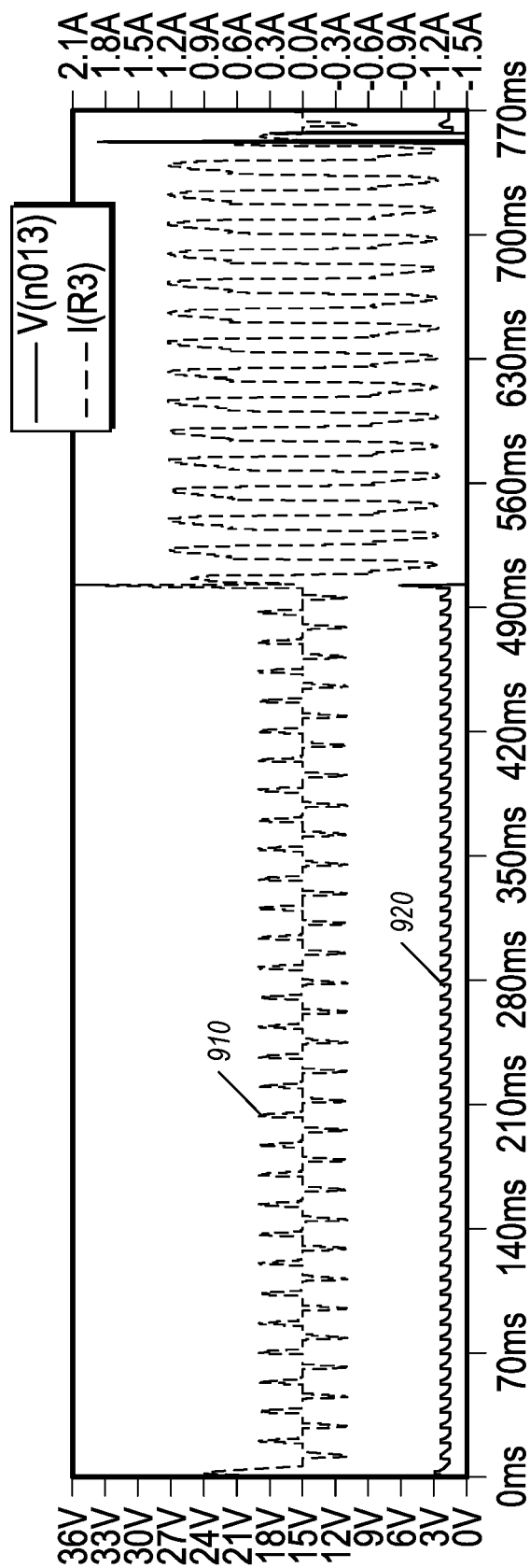

FIG. 9 illustrates example voltage and current measurements of the doorbell circuit in FIG. 7C. Trace 910 is the current that flows through wiring, which is also the current that flows through the system, such as from nodes A to B. Trace 920 is the voltage across the gate and source of transistor Q1, which is about two volts. This voltage may be achieved by using the resistance of the chime to pull the gate of transistor Q1 to the voltage of the AC to DC bridge diodes. The impedance of the chime in FIG. 7C is about eight ohms, but since no current flows the voltage drop across it is zero. The gate of the transistor Q2 sees the full AC to DC bridge diode output voltage. Q2 is a transistor picked that turns on with a very low voltage applied to its gate. No current may flow into the gate of transistor Q2 so no current may flow through the chime when it is not being rung. The gate of Q1 has the same AC to DC bridge diode DC voltage applied to it but after a voltage divider circuit and some filtering. The voltage divider means that the voltage of AC to DC bridge may become higher in order for Q1 to turn on and allow current to flow through the chime. When the chime is rung, which is signified by the doorbell shorting its wires, this causes almost all of the transformer voltage to be applied to the dehumming board. This corresponding rise in the DC voltage from the bridge diode after being divided creates a large enough voltage on Q2's gate for it to turn on. Q2 grounds its drain which is attached to the chime and to Q2. Ground or zero volts passes all the current through the chime while turning off Q2 so that Q2 can no longer pass any current through it and R_Load.

Figure 10:
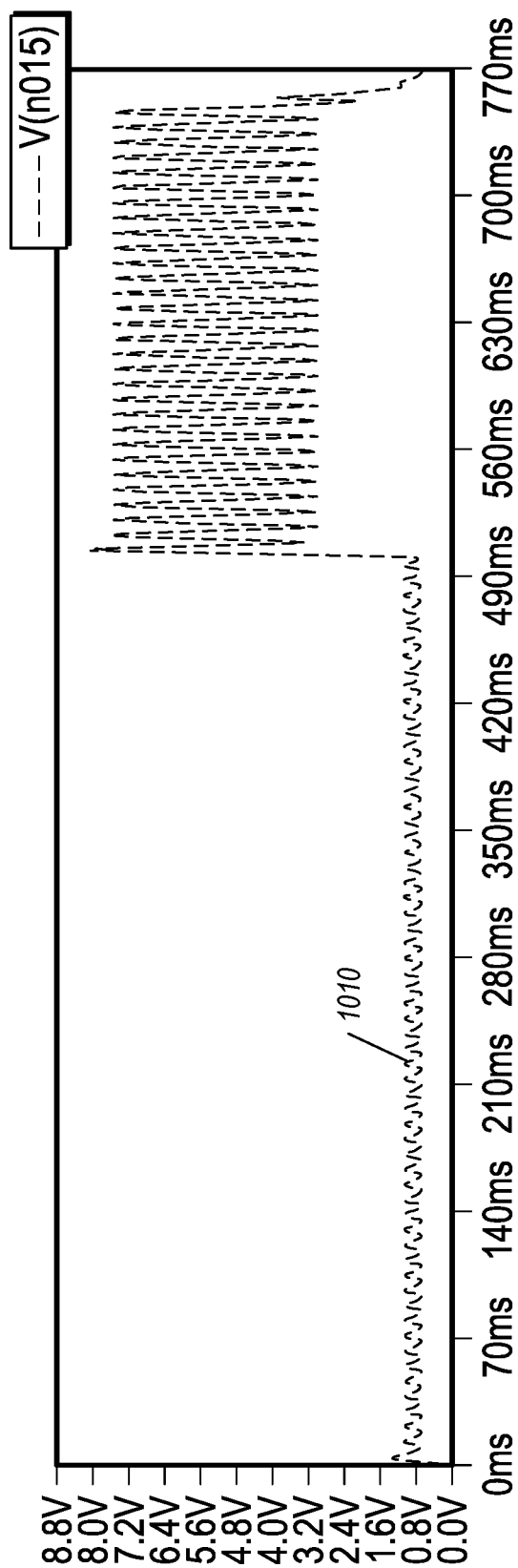

FIG. 10 illustrates example voltage and current measurements of simulated doorbell circuits that function in similar manner as the circuits of FIG. 7B or 7C. Trace 1010 is the voltage on the gate of first transistor (that couples to the chime) when current flows through the chime. The first transistor (e.g., a FET) may be a power transistor that requires a higher gate-source to turn on than a second, different transistor (e.g., another FET) of the simulation circuit. A detector DC voltage of the simulation circuit may be divided before being applied to the gate of the first transistor, which also increases the threshold of the detector voltage, which should be reached before the first transistor turns on to ring the chime. When the first transistor turns on, it forces the gate of transistor second transistor to ground, which turns off the second transistor. In some implementations, the first and second transistor of the simulation circuit correspond respectively to the transistors Q1 and Q2 of circuit 740.

Figure 11:
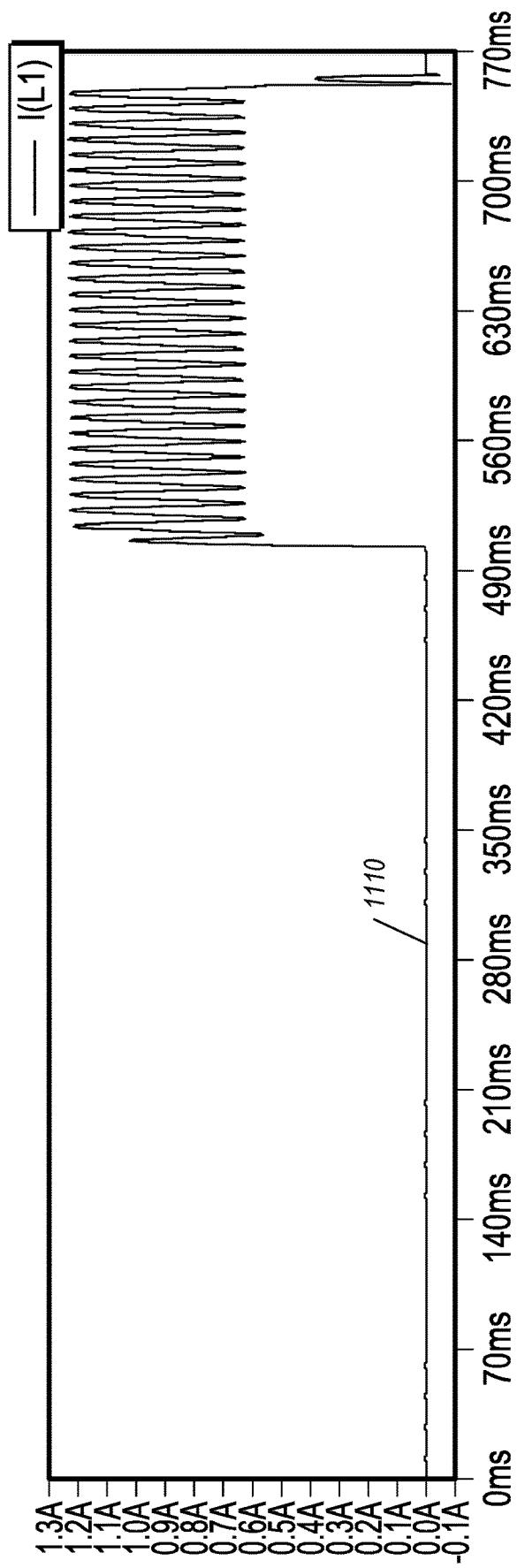

FIG. 11 illustrates another example voltage and current measurements of the simulated doorbell circuits. Trace 1110 is the current through the first transistor and the chime 210 in response to a ringing voltage being applied and the second transistor turning on.

Figure 12:
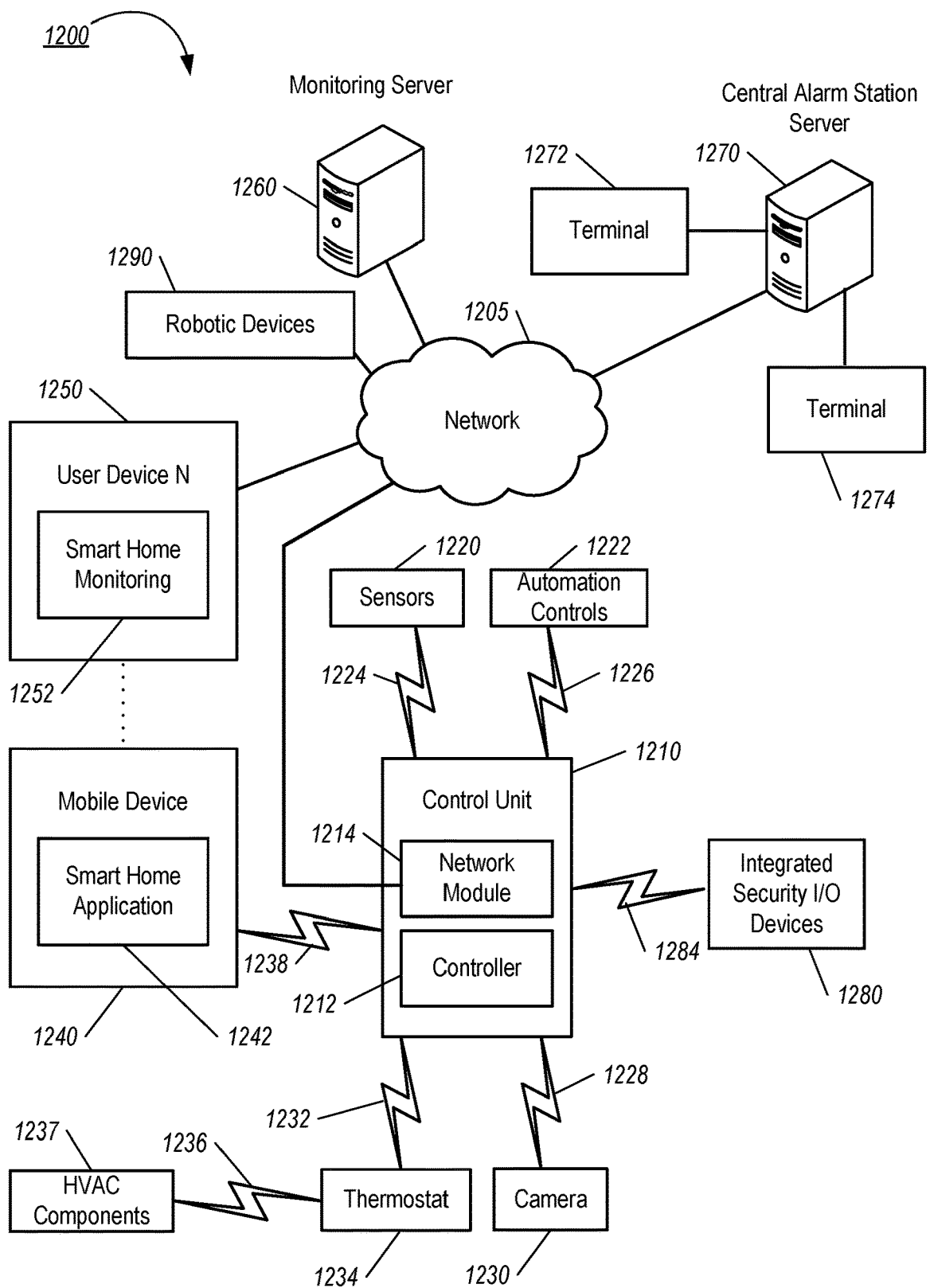
FIG. 12 is a block diagram illustrating an example security monitoring system.

FIG. 12 is a diagram illustrating an example of a home monitoring system 1200. The monitoring system 1200 includes a network 1205, a control unit 1210, one or more user devices 1240 and 1250, a monitoring server 1260, and a central alarm station server 1270. In some examples, the network 1205 facilitates communications between the control unit 1210, the one or more user devices 1240 and 1250, the monitoring server 1260, and the central alarm station server 1270.

The network 1205 is configured to enable exchange of electronic communications between devices connected to the network 1205. For example, the network 1205 may be configured to enable exchange of electronic communications between the control unit 1210, the one or more user devices 1240 and 1250, the monitoring server 1260, and the central alarm station server 1270. The network 1205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 1205 may include multiple networks or subnetworks, each of which may include, for example, a wired or wireless data pathway. The network 1205 may include a circuit-switched network, a packet-switched data network, or any other network able to carry electronic communications (e.g., data or voice communications). For example, the network 1205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 1205 may include one or more networks that include wireless data channels and wireless voice channels. The network 1205 may be a wireless network, a broadband network, or a combination of networks including a wireless network and a broadband network.

The control unit 1210 includes a controller 1212 and a network module 1214. The controller 1212 is configured to control a control unit monitoring system (e.g., a control unit system) that includes the control unit 1210. In some examples, the controller 1212 may include a processor or other control circuitry configured to execute instructions of a program that controls operation of a control unit system. In these examples, the controller 1212 may be configured to receive input from sensors, flow meters, or other devices included in the control unit system and control operations of devices included in the household (e.g., speakers, lights, doors, etc.). For example, the controller 1212 may be configured to control operation of the network module 1214 included in the control unit 1210.

The network module 1214 is a communication device configured to exchange communications over the network 1205. The network module 1214 may be a wireless communication module configured to exchange wireless communications over the network 1205. For example, the network module 1214 may be a wireless communication device configured to exchange communications over a wireless data channel and a wireless voice channel. In this example, the network module 1214 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, 5G CDMA, EDGE or EGPRS, EV-DO or EVDO, UMTS, or IP.

The network module 1214 also may be a wired communication module configured to exchange communications over the network 1205 using a wired connection. For instance, the network module 1214 may be a modem, a network interface card, or another type of network interface device. The network module 1214 may be an Ethernet network card configured to enable the control unit 1210 to communicate over a local area network and/or the Internet. The network module 1214 also may be a voice band modem configured to enable the alarm panel to communicate over the telephone lines of Plain Old Telephone Systems (POTS).

The control unit system that includes the control unit 1210 includes one or more sensors. For example, the monitoring system may include multiple sensors 1220. The sensors 1220 may include a lock sensor, a contact sensor, a motion sensor, or any other type of sensor included in a control unit system. The sensors 1220 also may include an environmental sensor, such as a temperature sensor, a water sensor, a rain sensor, a wind sensor, a light sensor, a smoke detector, a carbon monoxide detector, an air quality sensor, etc. The sensors 1220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 1220 can also include a radio-frequency identification (RFID) sensor that identifies a particular article that includes a pre-assigned RFID tag.

The control unit 1210 communicates with the home automation controls 1222 and a camera 1230 to perform monitoring. The home automation controls 1222 are connected to one or more devices that enable automation of actions in the home. For instance, the home automation controls 1222 may be connected to one or more lighting systems and may be configured to control operation of the one or more lighting systems. In addition, the home automation controls 1222 may be connected to one or more electronic locks at the home and may be configured to control operation of the one or more electronic locks (e.g., control Z-Wave locks using wireless communications in the Z-Wave protocol). Further, the home automation controls 1222 may be connected to one or more appliances at the home and may be configured to control operation of the one or more appliances. The home automation controls 1222 may include multiple modules that are each specific to the type of device being controlled in an automated manner. The home automation controls 1222 may control the one or more devices based on commands received from the control unit 1210. For instance, the home automation controls 1222 may cause a lighting system to illuminate an area to provide a better image of the area when captured by a camera 1230.

The camera 1230 may be a video/photographic camera or other type of optical sensing device configured to capture images. For instance, the camera 1230 may be configured to capture images of an area within a building or home monitored by the control unit 1210. The camera 1230 may be configured to capture single, static images of the area and also video images of the area in which multiple images of the area are captured at a relatively high frequency (e.g., thirty images per second). The camera 1230 may be controlled based on commands received from the control unit 1210.

The camera 1230 may be triggered by several different types of techniques. For instance, a Passive Infra-Red (PIR) motion sensor may be built into the camera 1230 and used to trigger the camera 1230 to capture one or more images when motion is detected. The camera 1230 also may include a microwave motion sensor built into the camera and used to trigger the camera 1230 to capture one or more images when motion is detected. The camera 1230 may have a "normally open" or "normally closed" digital input that can trigger capture of one or more images when external sensors (e.g., the sensors 1220, PIR, door/window, etc.) detect motion or other events. In some implementations, the camera 1230 receives a command to capture an image when external devices detect motion or another potential alarm event. The camera 1230 may receive the command from the controller 1212 or directly from one of the sensors 1220.

In some examples, the camera 1230 triggers integrated or external illuminators (e.g., Infra-Red, Z-wave controlled "white" lights, lights controlled by the home automation controls 1222, etc.) to improve image quality when the scene is dark. An integrated or separate light sensor may be used to determine if illumination is desired and may result in increased image quality.

The camera 1230 may be programmed with any combination of time/day schedules, system "arming state", or other variables to determine whether images should be captured or not when triggers occur. The camera 1230 may enter a low-power mode when not capturing images. In this case, the camera 1230 may wake periodically to check for inbound messages from the controller 1212. The camera 1230 may be powered by internal, replaceable batteries if located remotely from the control unit 1210. The camera 1230 may employ a small solar cell to recharge the battery when light is available. Alternatively, the camera 1230 may be powered by the controller's 1212 power supply if the camera 1230 is co-located with the controller 1212.

In some implementations, the camera 1230 communicates directly with the monitoring server 1260 over the Internet. In these implementations, image data captured by the camera 1230 does not pass through the control unit 1210 and the camera 1230 receives commands related to operation from the monitoring server 1260.

The system 1200 may also include a thermostat 1234 to perform dynamic environmental control at the home. The thermostat 1234 is configured to monitor temperature and/or energy consumption of an HVAC system associated with the thermostat 1234, and is further configured to provide control of environmental (e.g., temperature) settings. In some implementations, the thermostat 1234 can additionally or alternatively receive data relating to activity at a home and/or environmental data at a home, e.g., at various locations indoors and outdoors at the home. The thermostat 1234 can directly measure energy consumption of the HVAC system associated with the thermostat, or can estimate energy consumption of the HVAC system associated with the thermostat 1234, for example, based on detected usage of one or more components of the HVAC system associated with the thermostat 1234. The thermostat 1234 can communicate temperature and/or energy monitoring information to or from the control unit 1210 and can control the environmental (e.g., temperature) settings based on commands received from the control unit 1210.

In some implementations, the thermostat 1234 is a dynamically programmable thermostat and can be integrated with the control unit 1210. For example, the dynamically programmable thermostat 1234 can include the control unit 1210, e.g., as an internal component to the dynamically programmable thermostat 1234. In addition, the control unit 1210 can be a gateway device that communicates with the dynamically programmable thermostat 1234. In some implementations, the thermostat 1234 is controlled via one or more home automation controls 1222.

A module 1237 is connected to one or more components of an HVAC system associated with a home, and is configured to control operation of the one or more components of the HVAC system. In some implementations, the module 1237 is also configured to monitor energy consumption of the HVAC system components, for example, by directly measuring the energy consumption of the HVAC system components or by estimating the energy usage of the one or more HVAC system components based on detecting usage of components of the HVAC system. The module 1237 can communicate energy monitoring information and the state of the HVAC system components to the thermostat 1234 and can control the one or more components of the HVAC system based on commands received from the thermostat 1234.

In some examples, the system 1200 further includes one or more robotic devices 1290. The robotic devices 1290 may be any type of robots that are capable of moving and taking actions that assist in home monitoring. For example, the robotic devices 1290 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 1290 may be devices that are intended for other purposes and merely associated with the system 1200 for use in appropriate circumstances. For instance, a robotic vacuum cleaner device may be associated with the monitoring system 1200 as one of the robotic devices 1290 and may be controlled to take action responsive to monitoring system events.

In some examples, the robotic devices 1290 automatically navigate within a home or outside a home. In these examples, the robotic devices 1290 include sensors and control processors that guide movement of the robotic devices 1290 within the home or outside the home. For instance, the robotic devices 1290 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 1290 may include control processors that process output from the various sensors and control the robotic devices 1290 to move along a path that reaches the desired destination and avoids obstacles. In this regard, the control processors detect walls or other obstacles in the home or outside the home and guide movement of the robotic devices 1290 in a manner that avoids the walls, trees, fences, and other obstacles.

In addition, the robotic devices 1290 may store data that describes attributes of the home and the area outside the home. For instance, the robotic devices 1290 may store a floorplan, a property map, and/or a three-dimensional model of the home that enables the robotic devices 1290 to navigate the home. During initial configuration, the robotic devices 1290 may receive the data describing attributes of the home, determine a frame of reference to the data (e.g., a home or reference location in the home), and navigate the home based on the frame of reference and the data describing attributes of the home. Further, initial configuration of the robotic devices 1290 also may include learning of one or more navigation patterns in which a user provides input to control the robotic devices 1290 to perform a specific navigation action (e.g., fly to an upstairs bedroom and spin around while capturing video and then return to a home charging base). In this regard, the robotic devices 1290 may learn and store the navigation patterns such that the robotic devices 1290 may automatically repeat the specific navigation actions upon a later request.

In some examples, the robotic devices 1290 may include data capture and recording devices. In these examples, the robotic devices 1290 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 1290 to take and store a biometric sample that can be used to identify the person (e.g., a biometric sample with DNA that can be used for DNA testing).

In some implementations, the robotic devices 1290 may include output devices. In these implementations, the robotic devices 1290 may include one or more displays, one or more speakers, and/or any type of output devices that allow the robotic devices 1290 to communicate information to a nearby user.

The robotic devices 1290 also may include a communication module that enables the robotic devices 1290 to communicate with the control unit 1210, each other, and/or other devices. The communication module may be a wireless communication module that allows the robotic devices 1290 to communicate wirelessly. For instance, the communication module may be a Wi-Fi module that enables the robotic devices 1290 to communicate over a local wireless network at the home. The communication module further may be a 900 MHz wireless communication module that enables the robotic devices 1290 to communicate directly with the control unit 1210. Other types of short-range wireless communication protocols, such as Bluetooth, Bluetooth LE, Z-wave, Zigbee, etc., may be used to allow the robotic devices 1290 to communicate with other devices in the home. In some implementations, the robotic devices 1290 may communicate with each other or with other devices of the system 1200 through the network 1205.

The robotic devices 1290 further may include processor and storage capabilities. The robotic devices 1290 may include any suitable processing devices that enable the robotic devices 1290 to operate applications and perform the actions described throughout this disclosure. In addition, the robotic devices 1290 may include solid-state electronic storage that enables the robotic devices 1290 to store applications, configuration data, collected sensor data, and/or any other type of information available to the robotic devices 1290.

The robotic devices 1290 are associated with one or more charging stations. The charging stations may be located at predefined home base or reference locations in the home. The robotic devices 1290 may be configured to navigate to the charging stations after completion of tasks needed to be performed for the monitoring system 1200. For instance, after completion of a monitoring operation or upon instruction by the control unit 1210, the robotic devices 1290 may be configured to automatically fly to and land on one of the charging stations. In this regard, the robotic devices 1290 may automatically maintain a fully charged battery in a state in which the robotic devices 1290 are ready for use by the monitoring system 1200.

The charging stations may be contact based charging stations and/or wireless charging stations. For contact based charging stations, the robotic devices 1290 may have readily accessible points of contact that the robotic devices 1290 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 1290 may charge through a wireless exchange of power. In these cases, the robotic devices 1290 need only locate themselves closely enough to the wireless charging stations for the wireless exchange of power to occur. In this regard, the positioning needed to land at a predefined home base or reference location in the home may be less precise than with a contact based charging station. Based on the robotic devices 1290 landing at a wireless charging station, the wireless charging station outputs a wireless signal that the robotic devices 1290 receive and convert to a power signal that charges a battery maintained on the robotic devices 1290.

In some implementations, each of the robotic devices 1290 has a corresponding and assigned charging station such that the number of robotic devices 1290 equals the number of charging stations. In these implementations, the robotic devices 1290 always navigate to the specific charging station assigned to that robotic device. For instance, a first robotic device may always use a first charging station and a second robotic device may always use a second charging station.

In some examples, the robotic devices 1290 may share charging stations. For instance, the robotic devices 1290 may use one or more community charging stations that are capable of charging multiple robotic devices 1290. The community charging station may be configured to charge multiple robotic devices 1290 in parallel. The community charging station may be configured to charge multiple robotic devices 1290 in serial such that the multiple robotic devices 1290 take turns charging and, when fully charged, return to a predefined home base or reference location in the home that is not associated with a charger. The number of community charging stations may be less than the number of robotic devices 1290.

In addition, the charging stations may not be assigned to specific robotic devices 1290 and may be capable of charging any of the robotic devices 1290. In this regard, the robotic devices 1290 may use any suitable, unoccupied charging station when not in use. For instance, when one of the robotic devices 1290 has completed an operation or is in need of battery charge, the control unit 1210 references a stored table of the occupancy status of each charging station and instructs the robotic device to navigate to the nearest charging station that is unoccupied.

The system 1200 further includes one or more integrated security devices 1280. The one or more integrated security devices may include any type of device used to provide alerts based on received sensor data. For instance, the one or more control units 1210 may provide one or more alerts to the one or more integrated security input/output devices 1280. Additionally, the one or more control units 1210 may receive one or more sensor data from the sensors 1220 and determine whether to provide an alert to the one or more integrated security input/output devices 1280.

The sensors 1220, the home automation controls 1222, the camera 1230, the thermostat 1234, and the integrated security devices 1280 may communicate with the controller 1212 over communication links 1224, 1226, 1228, 1232, 1238, and 1284. The communication links 1224, 1226, 1228, 1232, 1238, and 1284 may be a wired or wireless data pathway configured to transmit signals from the sensors 1220, the home automation controls 1222, the camera 1230, the thermostat 1234, and the integrated security devices 1280 to the controller 1212. The sensors 1220, the home automation controls 1222, the camera 1230, the thermostat 1234, and the integrated security devices 1280 may continuously transmit sensed values to the controller 1212, periodically transmit sensed values to the controller 1212, or transmit sensed values to the controller 1212 in response to a change in a sensed value.

The communication links 1224, 1226, 1228, 1232, 1238, and 1284 may include a local network. The sensors 1220, the home automation controls 1222, the camera 1230, the thermostat 1234, and the integrated security devices 1280, and the controller 1212 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 12 (CATS) or Category 6 (CAT6) wired Ethernet network. The local network may be a mesh network constructed based on the devices connected to the mesh network.

The monitoring server 1260 is an electronic device configured to provide monitoring services by exchanging electronic communications with the control unit 1210, the one or more user devices 1240 and 1250, and the central alarm station server 1270 over the network 1205. For example, the monitoring server 1260 may be configured to monitor events generated by the control unit 1210. In this example, the monitoring server 1260 may exchange electronic communications with the network module 1214 included in the control unit 1210 to receive information regarding events detected by the control unit 1210. The monitoring server 1260 also may receive information regarding events from the one or more user devices 1240 and 1250.

In some examples, the monitoring server 1260 may route alert data received from the network module 1214 or the one or more user devices 1240 and 1250 to the central alarm station server 1270. For example, the monitoring server 1260 may transmit the alert data to the central alarm station server 1270 over the network 1205.

The monitoring server 1260 may store sensor and image data received from the monitoring system and perform analysis of sensor and image data received from the monitoring system. Based on the analysis, the monitoring server 1260 may communicate with and control aspects of the control unit 1210 or the one or more user devices 1240 and 1250.

The monitoring server 1260 may provide various monitoring services to the system 1200. For example, the monitoring server 1260 may analyze the sensor, image, and other data to determine an activity pattern of a resident of the home monitored by the system 1200. In some implementations, the monitoring server 1260 may analyze the data for alarm conditions or may determine and perform actions at the home by issuing commands to one or more of the controls 1222, possibly through the control unit 1210.

The monitoring server 1260 can be configured to provide information (e.g., activity patterns) related to one or more residents of the home monitored by the system 1200 (e.g., user 108). For example, one or more of the sensors 1220, the home automation controls 1222, the camera 1230, the thermostat 1234, and the integrated security devices 1280 can collect data related to a resident including location information (e.g., if the resident is home or is not home) and provide location information to the thermostat 1234.

The central alarm station server 1270 is an electronic device configured to provide alarm monitoring service by exchanging communications with the control unit 1210, the one or more user devices 1240 and 1250, and the monitoring server 1260 over the network 1205. For example, the central alarm station server 1270 may be configured to monitor alerting events generated by the control unit 1210. In this example, the central alarm station server 1270 may exchange communications with the network module 1214 included in the control unit 1210 to receive information regarding alerting events detected by the control unit 1210. The central alarm station server 1270 also may receive information regarding alerting events from the one or more user devices 1240 and 1250 and/or the monitoring server 1260.

The central alarm station server 1270 is connected to multiple terminals 1272 and 1274. The terminals 1272 and 1274 may be used by operators to process alerting events. For example, the central alarm station server 1270 may route alerting data to the terminals 1272 and 1274 to enable an operator to process the alerting data. The terminals 1272 and 1274 may include general-purpose computers (e.g., desktop personal computers, workstations, or laptop computers) that are configured to receive alerting data from a server in the central alarm station server 1270 and render a display of information based on the alerting data. For instance, the controller 1212 may control the network module 1214 to transmit, to the central alarm station server 1270, alerting data indicating that a sensor 1220 detected motion from a motion sensor via the sensors 1220. The central alarm station server 1270 may receive the alerting data and route the alerting data to the terminal 1272 for processing by an operator associated with the terminal 1272. The terminal 1272 may render a display to the operator that includes information associated with the alerting event (e.g., the lock sensor data, the motion sensor data, the contact sensor data, etc.) and the operator may handle the alerting event based on the displayed information.

In some implementations, the terminals 1272 and 1274 may be mobile devices or devices designed for a specific function. Although FIG. 12 illustrates two terminals for brevity, actual implementations may include more (and, perhaps, many more) terminals.

The one or more authorized user devices 1240 and 1250 are devices that host and display user interfaces. For instance, the user device 1240 is a mobile device that hosts or runs one or more native applications (e.g., the home monitoring application 1242). The user device 1240 may be a cellular phone or a non-cellular locally networked device with a display. The user device 1240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 1240 may perform functions unrelated to the monitoring system, such as placing personal telephone calls, playing music, playing video, displaying pictures, browsing the Internet, maintaining an electronic calendar, etc.

The user device 1240 includes a home monitoring application 1252. The home monitoring application 1242 refers to a software/firmware program running on the corresponding mobile device that enables the user interface and features described throughout. The user device 1240 may load or install the home monitoring application 1242 based on data received over a network or data received from local media. The home monitoring application 1242 runs on mobile devices platforms, such as iPhone, iPod touch, Blackberry, Google Android, Windows Mobile, etc. The home monitoring application 1242 enables the user device 1240 to receive and process image and sensor data from the monitoring system.

The user device 1240 may be a general-purpose computer (e.g., a desktop personal computer, a workstation, or a laptop computer) that is configured to communicate with the monitoring server 1260 and/or the control unit 1210 over the network 1205. The user device 1240 may be configured to display a smart home user interface 1252 that is generated by the user device 1240 or generated by the monitoring server 1260. For example, the user device 1240 may be configured to display a user interface (e.g., a web page) provided by the monitoring server 1260 that enables a user to perceive images captured by the camera 1230 and/or reports related to the monitoring system. Although FIG. 12 illustrates two user devices for brevity, actual implementations may include more (and, perhaps, many more) or fewer user devices.

In some implementations, the one or more user devices 1240 and 1250 communicate with and receive monitoring system data from the control unit 1210 using the communication link 1238. For instance, the one or more user devices 1240 and 1250 may communicate with the control unit 1210 using various local wireless protocols such as Wi-Fi, Bluetooth, Z-wave, Zigbee, MoCA, HomePlug (ethernet over power line), or wired protocols such as Ethernet and USB, to connect the one or more user devices 1240 and 1250 to local security and automation equipment. The one or more user devices 1240 and 1250 may connect locally to the monitoring system and its sensors and other devices. The local connection may improve the speed of status and control communications because communicating through the network 1205 with a remote server (e.g., the monitoring server 1260) may be significantly slower.

Although the one or more user devices 1240 and 1250 are shown as communicating with the control unit 1210, the one or more user devices 1240 and 1250 may communicate directly with the sensors and other devices controlled by the control unit 1210. In some implementations, the one or more user devices 1240 and 1250 replace the control unit 1210 and perform the functions of the control unit 1210 for local monitoring and long range/offsite communication.

In other implementations, the one or more user devices 1240 and 1250 receive monitoring system data captured by the control unit 1210 through the network 1205. The one or more user devices 1240, 1250 may receive the data from the control unit 1210 through the network 1205 or the monitoring server 1260 may relay data received from the control unit 1210 to the one or more user devices 1240 and 1250 through the network 1205. In this regard, the monitoring server 1260 may facilitate communication between the one or more user devices 1240 and 1250 and the monitoring system.

In some implementations, the one or more user devices 1240 and 1250 may be configured to switch whether the one or more user devices 1240 and 1250 communicate with the control unit 1210 directly (e.g., through link 1238) or through the monitoring server 1260 (e.g., through network 1205) based on a location of the one or more user devices 1240 and 1250. For instance, when the one or more user devices 1240 and 1250 are located close to the control unit 1210 and in range to communicate directly with the control unit 1210, the one or more user devices 1240 and 1250 use direct communication. When the one or more user devices 1240 and 1250 are located far from the control unit 1210 and not in range to communicate directly with the control unit 1210, the one or more user devices 1240 and 1250 use communication through the monitoring server 1260.

Although the one or more user devices 1240 and 1250 are shown as being connected to the network 1205, in some implementations, the one or more user devices 1240 and 1250 are not connected to the network 1205. In these implementations, the one or more user devices 1240 and 1250 communicate directly with one or more of the monitoring system components and no network (e.g., Internet) connection or reliance on remote servers is needed.

In some implementations, the one or more user devices 1240 and 1250 are used in conjunction with only local sensors and/or local devices in a house. In these implementations, the system 1200 includes the one or more user devices 1240 and 1250, the sensors 1220, the home automation controls 1222, the camera 1230, and the robotic devices 1290. The one or more user devices 1240 and 1250 receive data directly from the sensors 1220, the home automation controls 1222, the camera 1230, and the robotic devices 1290, and sends data directly to the sensors 1220, the home automation controls 1222, the camera 1230, and the robotic devices 1290. The one or more user devices 1240, 1250 provide the appropriate interfaces/processing to provide visual surveillance and reporting.

In other implementations, the system 1200 further includes network 1205 and the sensors 1220, the home automation controls 1222, the camera 1230, the thermostat 1234, and the robotic devices 1290, and are configured to communicate sensor and image data to the one or more user devices 1240 and 1250 over network 1205 (e.g., the Internet, cellular network, etc.). In yet another implementation, the sensors 1220, the home automation controls 1222, the camera 1230, the thermostat 1234, and the robotic devices 1290 (or a component, such as a bridge/router) are intelligent enough to change the communication pathway from a direct local pathway when the one or more user devices 1240 and 1250 are in close physical proximity to the sensors 1220, the home automation controls 1222, the camera 1230, the thermostat 1234, and the robotic devices 1290 to a pathway over network 1205 when the one or more user devices 1240 and 1250 are farther from the sensors 1220, the home automation controls 1222, the camera 1230, the thermostat 1234, and the robotic devices 1290.

In some examples, the system leverages GPS information from the one or more user devices 1240 and 1250 to determine whether the one or more user devices 1240 and 1250 are close enough to the sensors 1220, the home automation controls 1222, the camera 1230, the thermostat 1234, and the robotic devices 1290 to use the direct local pathway or whether the one or more user devices 1240 and 1250 are far enough from the sensors 1220, the home automation controls 1222, the camera 1230, the thermostat 1234, and the robotic devices 1290 that the pathway over network 1205 is required.

In other examples, the system leverages status communications (e.g., pinging) between the one or more user devices 1240 and 1250 and the sensors 1220, the home automation controls 1222, the camera 1230, the thermostat 1234, and the robotic devices 1290 to determine whether communication using the direct local pathway is possible. If communication using the direct local pathway is possible, the one or more user devices 1240 and 1250 communicate with the sensors 1220, the home automation controls 1222, the camera 1230, the thermostat 1234, and the robotic devices 1290 using the direct local pathway. If communication using the direct local pathway is not possible, the one or more user devices 1240 and 1250 communicate with the sensors 1220, the home automation controls 1222, the camera 1230, the thermostat 1234, and the robotic devices 1290 using the pathway over network 1205.

In some implementations, the system 1200 provides end users with access to images captured by the camera 1230 to aid in decision making. The system 1200 may transmit the images captured by the camera 1230 over a wireless WAN network to the user devices 1240 and 1250. Because transmission over a wireless WAN network may be relatively expensive, the system 1200 can use several techniques to reduce costs while providing access to significant levels of useful visual information (e.g., compressing data, downsampling data, sending data only over inexpensive LAN connections, or other techniques).

In some implementations, a state of the monitoring system and other events sensed by the monitoring system may be used to enable/disable video/image recording devices (e.g., the camera 1230). In these implementations, the camera 1230 may be set to capture images on a periodic basis when the alarm system is armed in an "away" state, but set not to capture images when the alarm system is armed in a "home" state or disarmed. In addition, the camera 1230 may be triggered to begin capturing images when the alarm system detects an event, such as an alarm event, a door-opening event for a door that leads to an area within a field of view of the camera 1230, or motion in the area within the field of view of the camera 1230. In other implementations, the camera 1230 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A circuit for powering a chime that outputs audio in response to detection of an entity by a video doorbell, the circuit comprising:
   a rectifier circuit configured to generate a first signal based on a power source;
   a first switch coupled to the rectifier circuit, wherein the first switch is configured to provide, based on the first signal, a first direct-current (DC) voltage signal during a first operating mode where the video doorbell receives input that triggers actuation of the chime in response to detection of the entity; and
   a second switch coupled to the rectifier circuit and the first switch, wherein the second switch is configured to provide, based on the first signal, a second DC voltage signal during a second operating mode where the chime outputs the audio based on the input that triggers actuation of the chime in response to detection of the entity.

2. The circuit of claim 1, further comprising:
switch control circuitry that includes a third switch coupled to the first switch, wherein the third switch is a current amplifier that generates a control signal to cause the first switch to turn on and provide the first DC voltage signal.

3. The circuit of claim 2, wherein the second switch is configured as a single pole double throw (SPDT) switch that is used to switch between at least two signal paths of the circuit.

4. The circuit of claim 2, wherein:
the first switch is a current-controlled bipolar junction transistor (BJT) that generates a base-emitter voltage from the first signal based on a current signal generated by the third switch;
the second switch is a voltage-controlled field effect transistor (FET) that generates a gate-to-source voltage proportional to the first signal generated by the rectifier circuit; and
the third switch is a current-controlled BJT that generates the current signal based on a threshold amount of current that flows along a circuit path that couples the second switch and the third switch.

5. The circuit of claim 2, wherein the threshold time period is less than 200 milliseconds.

6. The circuit of claim 1, comprising:
a voltage divider intermediate the rectifier circuit and the second switch, wherein the voltage divider is configured to generate a voltage that is proportional to the first signal generated by the rectifier circuit; and
a differentiator circuit coupled to the voltage divider, wherein the differentiator circuit cooperates with the voltage divider to accelerate turning off the second switch in the absence of an applied voltage to the chime.

7. The circuit of claim 6, wherein the adjusted voltage signal is used to turn on the second switch to ring the chime when the video doorbell receives input that triggers actuation of the chime in response to detection of the entity.

8. The circuit of claim 1, wherein the circuit is configured to:
generate the second DC voltage signal for a threshold time period to supply power to the chime without generating a current that induces magnetic effects in the chime that disrupt operation of the chime.

9. The circuit of claim 1, comprising:
a first signal path that corresponds to the first operating mode, and
the first switch routes power signals of the power source using the first signal path to apply available power of the power source to the video doorbell.

10. The circuit of claim 9, comprising:
a second, different signal path that corresponds to the second operating mode, and
the second switch routes power signals of the power source using the second signal path to apply available power of the power source to the chime to output the audio during the second operating mode.

11. The circuit of claim 10, wherein the available power of the power source is all of the power that is output by the power source.

12. The circuit of claim 1, wherein:
(i) the second switch is a field-effect transistor comprising a gate, a drain, and a source;
(ii) a voltage at the gate of the second switch is used to control when a current signal is routed through the chime to output the audio; and
(iii) the current signal corresponds to an output power of the power source.

13. The circuit of claim 1, wherein:
the first DC voltage signal is for powering a plurality of components of the video doorbell; and
the second DC voltage signal is for powering the chime in response to detection of the entity.

14. The circuit of claim 13, wherein the chime outputs audio in response to a button on the video doorbell being pressed by an individual.

15. The circuit of claim 13, wherein the chime outputs audio in response to detection of the entity based on:
an object detector of the video doorbell that detects objects in an image frame captured by the video doorbell.

16. The circuit of claim 15, wherein the chime outputs audio in response to detection of an individual based on:
a proximity sensor of the video doorbell that detects individuals within a threshold proximity of a property where the video doorbell is installed; or
a motion sensor of the video doorbell that detects motion within a threshold distance of the video doorbell.

17. The circuit of claim 1, wherein the power source is:
a regulated alternating-current (AC) power source configured to generate an AC power signal that is received as an input signal to the rectifier circuit; or
a DC power source configured to generate a DC power signal that is received as an input signal to the rectifier circuit.

18. A method implemented using a circuit for powering a chime that outputs audio in response to detection of an entity by a video doorbell, the method comprising:
generating, by a rectifier circuit of the circuit, a first signal based on a power source;
generating, using a first switch coupled to the rectifier circuit, a first direct-current (DC) voltage signal based on the first signal, wherein the first DC voltage signal is generated during a first operating mode where the video doorbell receives input that triggers actuation of the chime in response to detection of the entity;
generating, using a second switch coupled to the rectifier circuit and the first switch, a second DC voltage signal based on the first signal, wherein the second DC voltage signal is generated during a second operating mode where the chime outputs the audio based on the input that triggers actuation of the chime in response to detection of the entity; and
powering the chime based on the second DC voltage signal without generating a current signal that triggers a particular noise output from the chime.

19. The method of claim 18, comprising:
generating, by a switch control circuitry of the circuit, a control signal to cause the first switch to turn on and provide the first DC voltage signal,
wherein the switch control circuitry includes a third switch that is coupled to the first switch, and the third switch is a current amplifier that generates the control signal.

20. The method of claim 18, comprising:
generating an adjusted voltage signal using a voltage divider that is intermediate the rectifier circuit and the second switch,
wherein the voltage divider is configured to generate the adjusted voltage signal by adjusting a magnitude of the first signal.

* * * * *